(12) United States Patent
Giordano

(10) Patent No.: US 8,887,623 B2
(45) Date of Patent: Nov. 18, 2014

(54) DEVICE FOR REMOVING SPENT FLAVOR BASE FROM A BEVERAGE BREWING APPARATUS

(76) Inventor: Samuel Giordano, Vienna, VA (US)

( * ) Notice: Subject to any disclaimer, the term of this patent is extended or adjusted under 35 U.S.C. 154(b) by 396 days.

(21) Appl. No.: 13/165,313

(22) Filed: Jun. 21, 2011

(65) Prior Publication Data

US 2012/0328750 A1    Dec. 27, 2012

(51) Int. Cl.
*A47J 31/06*    (2006.01)
*A47J 31/20*    (2006.01)

(52) U.S. Cl.
CPC ........................................ *A47J 31/20* (2013.01)
USPC ............................................... 99/297; 99/295

(58) Field of Classification Search
USPC .................................................... 99/297, 295
See application file for complete search history.

(56) References Cited

U.S. PATENT DOCUMENTS

| | | | |
|---|---|---|---|
| 1,346,485 A | 7/1920 | de Arrigunaga | |
| 1,699,303 A | 1/1929 | Mennicke et al. | |
| 2,109,363 A | 2/1938 | Williams | |
| 3,307,474 A | 3/1967 | Kasher | |
| 3,657,993 A * | 4/1972 | Close | 99/297 |
| 4,365,544 A | 12/1982 | Howitt et al. | |
| 4,739,696 A | 4/1988 | Sheen | |
| 5,544,566 A | 8/1996 | Bersten | |
| 5,979,299 A | 11/1999 | Hornsby et al. | |
| 6,231,909 B1 * | 5/2001 | Levinson | 426/433 |
| 7,213,507 B2 * | 5/2007 | Glucksman et al. | 99/297 |
| 7,279,660 B2 * | 10/2007 | Long et al. | 219/441 |
| 7,559,274 B2 * | 7/2009 | Wilhite | 99/297 |
| 7,745,759 B2 * | 6/2010 | Long et al. | 219/214 |
| 2007/0151461 A1 * | 7/2007 | Edmark et al. | 99/279 |
| 2009/0229472 A1 * | 9/2009 | Ferrara, Jr. | 99/323 |
| 2010/0319549 A1 * | 12/2010 | Kelty et al. | 99/297 |
| 2011/0083560 A1 * | 4/2011 | Chen | 99/279 |

* cited by examiner

*Primary Examiner* — Anthony Weier
(74) *Attorney, Agent, or Firm* — Birch, Stewart, Kolasch & Birch, LLP

(57) ABSTRACT

The device is an extraction basket inserted and depressed to the bottom of a brewing apparatus' brewing chamber prior to adding flavor base and water to the chamber. Following the French press process of brewing, a filtration piston is inserted into the brewing chamber. After the allotted brewing time, the filtration piston is depressed into the chamber, thus pushing the spent flavor base to the bottom of the chamber, filtering the brewed beverage from the solid flavor base, and compacting the spent flavor base in the extraction basket. Once the brewed beverage has been removed, the filtration piston is removed from the chamber. The user then reaches into the chamber, lifts a handle on the extraction basket and quickly and neatly removes the basket and spent flavor base in one efficient motion whereupon the spent flavor base can be discarded properly without effort or mess.

12 Claims, 4 Drawing Sheets

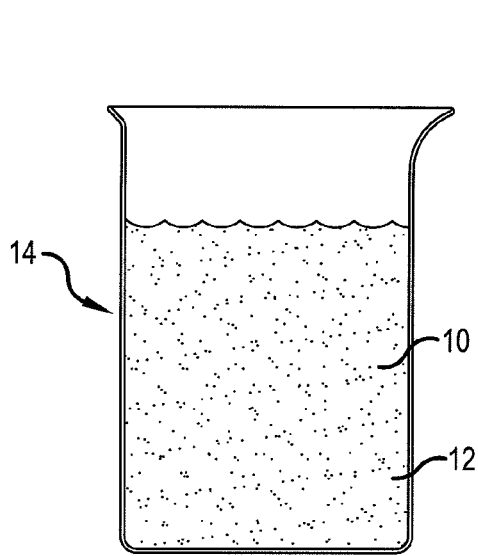
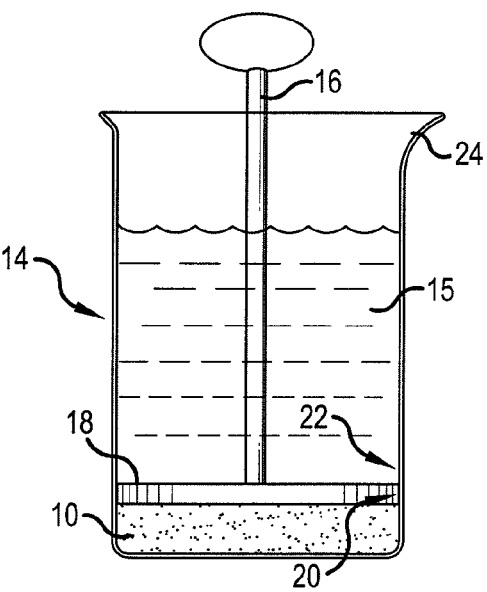
FIG.1
PRIOR ART
FIG.2
PRIOR ART
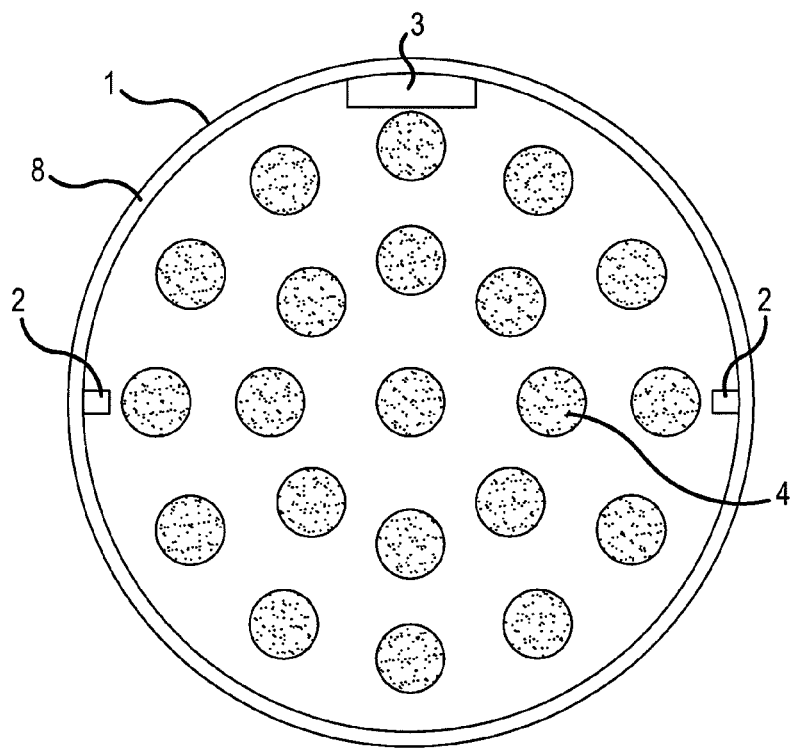
FIG.3

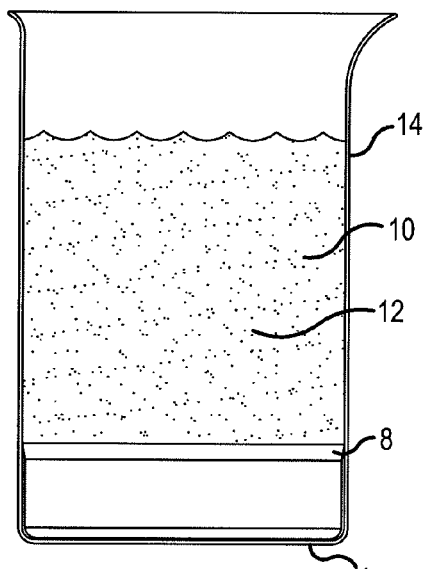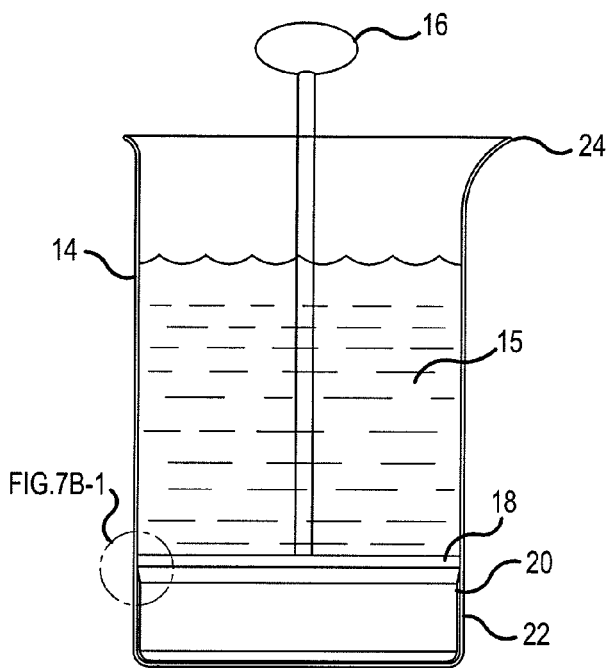
FIG.7A  FIG.7B
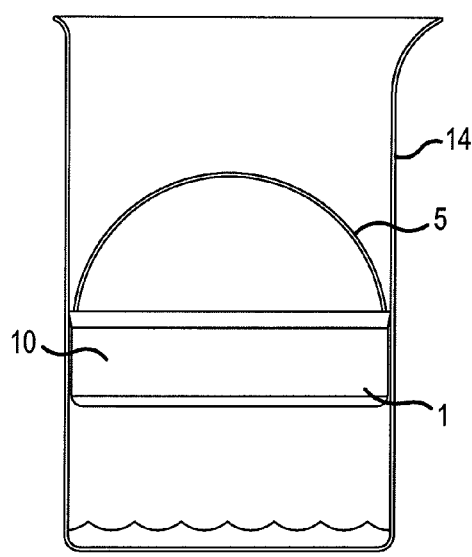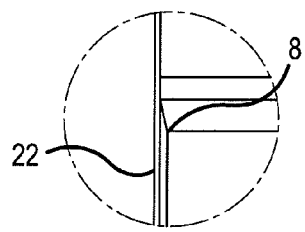
FIG.8  FIG.7B-1

DEVICE FOR REMOVING SPENT FLAVOR BASE FROM A BEVERAGE BREWING APPARATUS

FIELD OF THE INVENTION

The invention relates generally to an apparatus used in conjunction with a beverage brewing apparatus known as a "French Press."

BACKGROUND OF THE INVENTION

The French press technique for brewing beverages has long been considered to be one of the best and most efficient methods for brewing coffee, and sometimes tea. The French press method allows for the optimal proportional ratio between the amount of beverage (e.g., coffee) brewed to the amount of flavor base (e.g., ground coffee) used. For coffee, the full flavored taste and efficiency is a result of the process by which the coffee grounds are thoroughly saturated by allowing the maximum surface area of the coffee grounds to make contact with the water during the brewing time. The theory being the greater the contact area and contact time, the more thorough the wetting of the coffee grounds and thus the more complete the brewing process and more of the flavor that can be extracted. Unfortunately consumers and commercial establishments tend to avoid the use of the French press because of the issues around clean-up.

Referring to FIGS. 1 and 2, the French press technique is described for a particular example where coffee is being brewed.

Referring to FIG. 1, one places a flavor base (i.e. ground coffee) 10 and hot water 12 in a brewing chamber 14, and allows coffee to brew. Because the flavor base 10 often floats to the surface of the water 12, one may stir or otherwise agitate the mixture of the ground coffee and the water to more thoroughly wet the individual coffee grounds that constitute the ground coffee.

Referring to FIG. 2, after the coffee 15 has brewed, one grasps a handle 16 of a filter piston 18 (also referred to as "filtration piston"), inserts the filter piston 18 into the brewing chamber 14, and presses the filter piston 18 down toward the bottom of the pot. For the taste of the brewed beverage to be relatively uniform from container to container, one typically uses and manually monitors a timer to measure the brew time.

Because the filter piston 18 passes liquid but does not pass solid flavor base particles, as one presses the filter piston toward the bottom of the brewing chamber 14, the solid particle free brewed beverage 15 fills the portion of the container above the filter piston while the filter retains the solid waste (spent flavor base) 10 in the portion of the container below the filter. The edge 20 of the filter piston 18 and the inner side 22 of the brewing chamber 14 form a seal sufficient to prevent solid spent flavor base grounds from passing between the edge of the filter and the inner side of the chamber.

After one presses the filter 18 below a spout 24 of the brewing chamber 14, he can pour the substantially particle-free brewed beverage 15 into a cup (not shown in FIGS. 1 and 2) via the spout 24. Although one may stop pressing the filter piston 18 after the filter is below the spout 24, one typically presses the filter all the way to the bottom of the coffee container 14 to reduce the chances of undersized coffee grounds passing through the filter and into the cup.

Despite the efficiencies in the brewing process there is an inherent inefficiency in the clean-up process. These inefficiencies deter both commercial and general consumer users. Traditionally cleaning a French press requires the user to remove the spent flavor base by hand which is often a messy process.

Still referring to FIG. 2, after one pours out the remaining brewed beverage 15, he retracts the filter piston 18 from the brewing chamber 14 by pulling on the piston handle 16. The user then must reach into the chamber and remove the spent flavor base 10 by hand. Once the chamber 14 is free of the spent flavor base, the user can clean then chamber and filter piston.

Attempts to avoid contact with the wet spent flavor base often leads to more issues such as a clogged drain or broken brewing chambers. The user can not simply rinse the grounds out down the drain because often grounds will clog the drain. Attempts to simply dump the spent flavor base into the trash do not usually work because the wet flavor base just sticks to the bottom and sides of the brewing chamber. Since the most brewing chambers are made of glass, smacking or shaking the chamber to remove the sticking grounds often results in an unfavorable result.

SUMMARY OF THE INVENTION

The present invention is directed to a device, referred to herein as an "extraction basket," that is used in conjunction with a French press brewing apparatus to extract spent flavor base during the clean-up process. The French press brewing apparatus traditionally includes a chamber for brewing and a filter piston assembly that is disposed in the chamber to filter the flavor base from the brewed beverage. The present invention provides an additional component to such apparatus in the form of the extraction basket. The extraction basket is inserted into the brewing chamber prior to use (before the addition of liquid and flavor base) and then extracted after use (when cleaning the apparatus). The brewing chamber receives a liquid such as water, and a flavor base such as ground coffee, and allows the beverage to brew from a mixture of the liquid and the flavor base. A solid such as spent coffee grounds is filtered from the brewed beverage by depressing the filter piston into the chamber allowing the brewed beverage to pass through the filter but not the solid flavor base. The filter piston pushes the solid spent flavor base to the bottom of the brewing chamber and into the waiting extraction basket. Since the extraction basket is first inserted into the basket in the empty brewing chamber prior to brewing, the spent flavor base can be easily collected by simply removing the basket during clean-up after the beverage has been brewed and consumed/removed.

BRIEF DESCRIPTION OF THE DRAWINGS

FIGS. 1-2 illustrate a conventional French press technique for brewing coffee.

FIGS. 3, 4, and 6 are views of the invention and components.

FIGS. 7A, 7B, and 7B-1 illustrates the French press brewing process with the use of the invention.

FIG. 8 illustrates the clean-up process with the use of the invention.

PARTS ILLUSTRATED IN DRAWINGS

1—Extraction Basket Housing
2—Pivot Pins
3—Handle Rest
4—Drain Holes with Filter Mesh
5—Handle 8—Flexible Lip
10—Flavor Base
12—Liquid
14—Brewing Chamber
15—Brewed Beverage
16—Filter Piston Assembly
18—Filter Piston
20—Outer Edge of the Filter Piston
22—Inner Wall of Brewing Chamber
24—Spout

DETAILED DESCRIPTION

Exemplary embodiments of the present invention are directed to a device that is used in conjunction with beverage brewing apparatuses that utilize the French press method of brewing.

Figure 4:
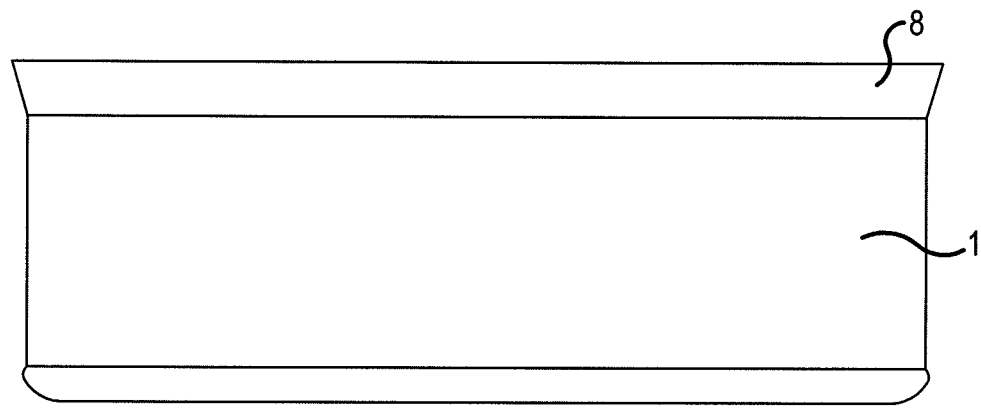
Figure 5:
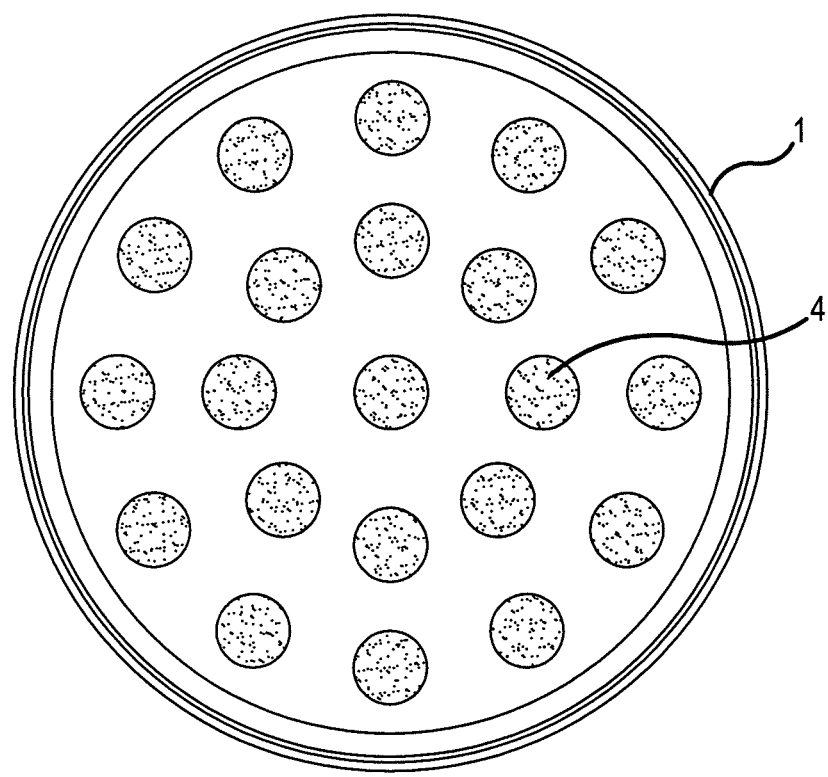
Figure 6:
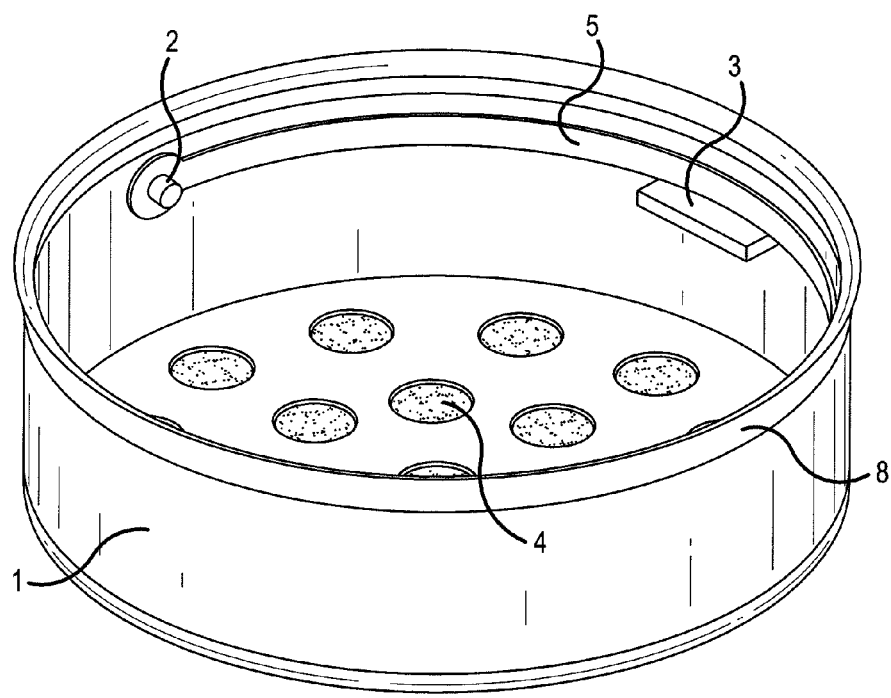

FIGS. 3-6 illustrate various views of such device according to an exemplary embodiment. As shown in these figures, the housing 1 of the device is shaped as a basket, and thus referred to herein as an "extraction basket." Particularly, FIG. 3 illustrates a top view of the device looking down through an opening of the extraction basket 1, while FIG. 5 illustrates a bottom view of the device. Furthermore, FIG. 4 illustrates a side view of the device, while FIG. 6 provides a view of the device from an angle.

The extraction basket 1 may be made of metal, plastic, rubber, silicon or any other durable material that is sufficient to operate under the conditions described in more detail below.

The extraction basket 1 may be essentially cylindrical and has an opening at its top. However, as shown in the figures, the bottom of the extraction basket 1 is only partially solid in the sense that it contains multiple filtration openings 4, i.e., holes covered by a fine mesh, which are referred to in this specification as "drain holes." The mesh should be of such nature as to allow excess liquid to pass through, but not allow any solid flavor base 10 to escape. These drain holes 4 are also designed to allow air to pass through in such manner as to equalize the pressure between the extraction basket 1 and the bottom of the brewing chamber 14, thus ensuring easy removal of the basket 1 during clean-up. The number and distribution of drain holes 4 may be varied from what is shown in the figures.

Referring to FIG. 6, the device includes a handle 5 attached on the inner perimeter at or near the top opening of the extraction basket 1. The ends of this handle 5 may be attached to two pivot pins 2 (see FIGS. 3 and 6) connected to the inner perimeter of the extraction basket 1. FIG. 6 shows the handle 5 positioned in such manner in a "down" position, such that it would not interfere with the filter piston 18 while pressing the flavor base 10 to the bottom during the French press brewing process. However, the ends of the handle 5 can rotate about the pivot pins 2 to allow the handle 5 to be swung into an "up" position, as illustrated in FIG. 8 which will be described in more detail below.

Referring to FIG. 4, around the opening of the extraction basket 1 is a gasket or flexible lip 8 that extends past the outer diameter of the basket 1, but flexes to ensure a seal around the top of the basket 1 against the inner surface 22 of the brewing chamber 14.

FIG. 7B illustrates the French press brewing process with the use of the device of the present invention. The device is used to extract the spent flavor base 10 from a brewing apparatus's brewing chamber 14 after use, during the clean-up. Accordingly, the extraction basket 1 is designed to fit into the bottom of the brewing chamber 14 as illustrated in FIG. 7A. This means that the diameter of the extraction basket 1 is slightly smaller than that of the brewing chamber 14, enough to the basket 1 to move freely in and out of the chamber 14. However, the extraction basket 1 should have a sufficiently large diameter so that, with the help of the flexible lip 8 described above, a seal is maintained between the basket 1 and the inner surface 22 of the chamber 14 so that none of the solid flavor base 10 is able to fit therebetween, as shown in FIG. 7B-1.

While the diameter of the extraction basket 1 may be dictated by the brewing chamber 14, the depth of the basket 1 may vary depending on how strong or weak the brew is (i.e., on how much flavor base 10 will be used). The depth of the extraction basket 1 should be sufficient to hold the entire flavor base 10 that will be used in the brewing process. It is contemplated that extraction baskets 1 may be provided in multiple depths to allow for stronger or weaker brews. Furthermore, the contour of the extraction basket 1 flowing from the edges to the bottom preferably matches that of the brewing chamber (although this is not strictly required). This helps the basket 1 to fit snugly to the contour of the bottom of the brewing chamber 14.

According to a preferred embodiment, the extraction basket 1 is inserted into the brewing chamber 14 and depressed to the bottom, as shown in FIG. 7A), prior to adding the flavor base 10 and liquid 12. When depressed to the bottom of the chamber 14, and with the handle 5 swung in the down position, the extraction basket 1 does not interfere with the brewing process and is capable of functioning within the brewing environment. During brewing, the flavor base 10 and hot liquid 12 (e.g., water) can be mixed within the brewing chamber per the standard French press methodology of brewing. Once brewing is complete, the spent flavor base 10, or solid flavor base 10, is separated from the brewed beverage 15 by depressing a filtration piston 18 into the brewing chamber as shown in FIG. B 14. As described above, the filtration piston 18 allows the brewed beverage 15, but not the solid spent flavor base 10 to pass through the filter. As the filter piston 18 is depressed, the solid flavor base is pushed toward the bottom of the brewing chamber 14 and becomes trapped in the extraction basket 1.

FIG. 8 illustrates the clean-up process with the use of the invention. Once the brewed beverage has been consumed or removed, and after the filtration piston 18 has been removed, the handle 5 can be swung in the up position as shown in FIG. 8. While in the up position, the handle can be grasped and used to pull the extraction basket 1, which contains the spent flavor base 10, out of the brewing chamber 14. Accordingly, the spent flavor base 10 is easily and neatly removed from the brewing chamber 14, leaving the chamber 14 ready for reuse.

While particular embodiments are described above for purposes of example, the present invention covers any and all obvious variations as would be readily contemplated by those skilled in the art.

What is claimed is:

1. A device for use in connection with a beverage brewing apparatus while brewing a beverage using a French press technique, the beverage brewing apparatus including a brewing chamber which receives a solid flavor base and liquid prior to insertion of a filter piston into the brewing chamber, the device comprising:

an extraction basket insertable into said brewing chamber in a sliding manner so as to be depressed to the bottom of the brewing chamber; and a handle attached to the extraction basket which is graspable while the extraction basket is depressed to the bottom of the brewing chamber, the handle being positionable to be used for pulling the extraction basket out of the brewing chamber in a sliding manner and positionable to allow the filter piston to press the flavor base to the bottom of the extraction basket,
wherein the bottom surface of the extraction basket includes one or more filtration openings which allows passage of air and the liquid, but blocks passage of the flavor base, from the extraction basket to the bottom of the brewing chamber,
the extraction basket is configured so that when the extraction basket is depressed to the bottom of the brewing chamber, substantially the entire bottom surface of the extraction basket rests flat against the bottom of the brewing chamber, and
the extraction basket is of sufficient depth as to hold the entirety of the flavor base used to brew the beverage.

2. The device of claim 1, wherein the extraction basket is of sufficient diameter, slightly smaller than the diameter of the brewing chamber, to allow the extraction basket to slide in and out freely.

3. The device of claim 1, wherein the extraction basket is cylindrical and has an opening on top.

4. The device of claim 3, wherein a top edge around the opening of the extraction basket is a flexible lip that extends past the outer diameter of the extraction basket.

5. The device of claim 4, wherein the top edge tapers out and flexes out to make a snug fit between the top edge of the extraction basket and an inner surface of the brewing chamber.

6. The device of claim 1, wherein a bottom edge of the extraction basket is rounded into a flat bottom to match a contour of the bottom of the brewing chamber.

7. The device of claim 1, wherein the extraction basket is made out of at least one of the following materials: plastic, metal, rubber, and silicon.

8. A device for use in connection with a beverage brewing apparatus while brewing a beverage using a French press technique, the beverage brewing apparatus including a brewing chamber which receives a solid flavor base and liquid prior to insertion of a filter piston into the brewing chamber, the device comprising:
an extraction basket insertable into said brewing chamber in a sliding manner so as to be depressed to the bottom of the brewing chamber; and
a handle attached to the extraction basket which is graspable while the extraction basket is depressed to the bottom of the brewing chamber, the handle being positionable to be used for pulling the extraction basket out of the brewing chamber in a sliding manner and positionable to allow the filter piston to press the flavor base to the bottom of the extraction basket, wherein
the bottom surface of the extraction basket includes one or more filtration opening which allows passage of air and the liquid, but blocks passage of the flavor base, from the extraction basket to the bottom of the brewing chamber,
the extraction basket is of sufficient depth as to hold the entirety of the flavor base used to brew the beverage, and
the handle attaches to pivot points on the inside of the extraction basket.

9. The device of claim 8, wherein the pivot points are positioned substantially ¼ inch below a top edge of the extraction basket.

10. The device of claim 8, wherein the handle is switchably positionable in an up position and a down position, the handle being placed in the up position to pull the extraction basket out of the brewing chamber.

11. The device of claim 10, wherein, in the down position, the handle rests along the inside perimeter of the extraction basket below the top edge so as to allow the filter piston to press the flavor base.

12. The device of claim 8, wherein the handle is made of metal or plastic.

* * * * *